United States Patent
Nihei et al.

(10) Patent No.: US 8,624,871 B2
(45) Date of Patent: Jan. 7, 2014

(54) METHOD AND APPARATUS FOR SENSING AND SCANNING A CAPACITIVE TOUCH PANEL

(75) Inventors: Tatsuyuki Nihei, Tokyo (JP); Osamu Uchino, Kanagawa (JP); Tatsuro Sato, Tokyo (JP)

(73) Assignee: Texas Instruments Incorporated, Dallas, TX (US)

( * ) Notice: Subject to any disclaimer, the term of this patent is extended or adjusted under 35 U.S.C. 154(b) by 165 days.

(21) Appl. No.: 13/184,321

(22) Filed: Jul. 15, 2011

(65) Prior Publication Data

US 2013/0016062 A1    Jan. 17, 2013

(51) Int. Cl.
*G06F 3/045* (2006.01)

(52) U.S. Cl.
USPC .......................................................... 345/174

(58) Field of Classification Search
USPC .................................. 345/174, 173
See application file for complete search history.

(56) References Cited

U.S. PATENT DOCUMENTS

| | | | |
|---|---|---|---|
| 5,526,294 A | 6/1996 | Ono et al. | |
| 5,565,658 A | 10/1996 | Gerpheide et al. | |
| 6,366,099 B1 | 4/2002 | Reddi | |
| 6,611,257 B1 * | 8/2003 | Dotson et al. | 345/174 |
| 7,944,405 B2 * | 5/2011 | Park et al. | 345/1.1 |
| 8,253,703 B2 * | 8/2012 | Eldering | 345/173 |
| 8,355,009 B2 * | 1/2013 | Mcdermid | 345/174 |
| 2004/0100450 A1 | 5/2004 | Choi | |
| 2009/0009486 A1 | 1/2009 | Sato et al. | |
| 2010/0110040 A1 | 5/2010 | Kim et al. | |
| 2011/0025634 A1 | 2/2011 | Krah et al. | |

OTHER PUBLICATIONS

PCT Search Report dated Dec. 26, 2012.

* cited by examiner

*Primary Examiner* — Fred Tzeng
(74) *Attorney, Agent, or Firm* — Alan A. R. Cooper; W. James Brady, III; Frederick J. Telecky, Jr.

(57) ABSTRACT

A method is provided. A first voltage is applied to a first set of column electrodes within a touch panel during a first interval, and a second voltage is applied to a second set of column electrodes within the touch panel during the first interval. The first and second sets of electrodes are adjacent to one another, and the second voltage has the opposite polarity of the first voltage. During the first interval, a first measurement signal is received from a set of row electrodes in the touch panel, and the first measurement signal is integrated to generate a first integrated signal. The first voltage is applied to the second set of column electrodes within the touch panel during a second interval, and the second voltage is applied to the first set of column electrodes within the touch panel during the second interval. During the second interval, a second measurement signal is received from the set of row electrodes in the touch panel, and the second measurement signal is integrated to generate a second integrated signal. Then, the first and second integrated signals are combined to generate an output signal.

20 Claims, 4 Drawing Sheets

METHOD AND APPARATUS FOR SENSING AND SCANNING A CAPACITIVE TOUCH PANEL

TECHNICAL FIELD

The invention relates generally to capacitive touch panels and, more particularly, to touch panel controllers that perform scanning and sensing operations.

BACKGROUND

Many capacitive touch panels or capacitive touch screens employ projected capacitive sensing to determine touch locations. Generally, each touch sensor within the touch panel is comprised of a two electrodes under a transparent plate (i.e., plastic), and, when a dielectric (i.e., finger) is in proximity to the two plates (with one plate being an excitation plate and one being a detection plate), the capacitance between the two plates decreases. In order to determine the location of the touch event (i.e., where the finger increases capacitance), the touch screen controller will usually "scan through" the excitation and detection plates and calculated the position of the touch event. One problem with these systems, however, is noise. Usually, the touch events result in about 0.1 pF of increased capacitance, and a finger can inject noise when touching the panel (i.e., 60-cycle noise). Thus, the touch event can be lost in the noise. Therefore, there is a need for an improved touch panel controller.

Some other examples of conventional circuits are: U.S. Pat. Nos. 5,526,294; 5,565,658; and 6,366,099.

SUMMARY

An embodiment of the present invention, accordingly, provides an apparatus. The apparatus comprises an interface having a first set of terminals and a second set of terminals, wherein the first and second sets of terminals are configured to be coupled to a touch panel, wherein the interface provides a first excitation voltage to a first terminal from the first set of terminals during a first portion of a scan period, and wherein the interface provides a second excitation voltage to a second terminal from the first set of terminals during the first portion of the scan period, and wherein the interface provides the first excitation voltage to the second terminal from the first set of terminals during a second portion of the scan period, and wherein the interface provides the second excitation voltage to the first terminal from the first set of terminals during the second portion of the scan period, and wherein the second excitation voltage has the opposite polarity of the first excitation voltage, and wherein the interface receives first and second measurement signals from a first terminal from the second set of terminals during the first and second portions of the scan period, respectively; and an analog front end (AFE) that is coupled to the interface so as to receive the measurement signal, wherein the AFE integrates the first and second measurement signal to generate first and second integrated signals, and wherein the AFE combines first and second integrated signals to generate an output signal.

In accordance with an embodiment of the present invention, the interface further comprises: a multiplexer that is coupled to each terminal from the second set of terminals and that is coupled to the AFE; and an exciter that is coupled to each terminal from the second set terminals.

In accordance with an embodiment of the present invention, the AFE further comprises: an integrator that is coupled to the multiplexer; an analog-to-digital converter (ADC) that is coupled to the integrator; and a summing circuit that is coupled to the ADC.

In accordance with an embodiment of the present invention, the integrator further comprises: an amplifier having a first input terminal, a second input terminal, and an output terminal, wherein the first input terminal of the amplifier receives a reference voltage, and wherein the second input terminal of the amplifier is coupled to the multiplexer, and wherein the output terminal of the amplifier is coupled to the ADC; a capacitor that is coupled between the second input terminal of the amplifier and the output terminal of the amplifier; and a switch that is coupled between the second input terminal of the amplifier and the output terminal of the amplifier, wherein the switch is controlled by a sample signal.

In accordance with an embodiment of the present invention, the summing circuit further comprises: a delay circuit that is coupled to the ADC; and an adder that is coupled to the ADC and delay circuit.

In accordance with an embodiment of the present invention, the touch panel controller further comprises: a digital front end (DFE) that is coupled to the AFE; and control logic that is coupled to the DFE and AFE.

In accordance with an embodiment of the present invention, an apparatus is provided. The apparatus comprises a touch panel having: a plurality of column sensor electrodes arranged in a plurality of columns; a first set of strip electrodes, wherein each strip electrode from the first set of strip electrodes is coupled to each column electrode within at least one of the plurality of columns; a plurality of row sensor electrodes arranged in a plurality of rows; and a second set of strip electrodes, wherein each strip electrode from the second set of strip electrodes is coupled to each row electrode within at least one of the plurality of rows; and a touch panel controller having: an interface that is coupled to each strip electrode from the first and second sets of strip electrodes, wherein the interface provides a first excitation voltage to a first strip electrode from the first set of strip electrodes during a first portion of a scan period, and wherein the interface provides a second excitation voltage to a second strip electrode from the first set of strip electrodes during the first portion of the scan period, and wherein the interface provides the first excitation voltage to the strip electrode from the first set of strip electrodes during a second portion of the scan period, and wherein the interface provides the second excitation voltage to the second strip electrode from the first set of strip electrodes during the second portion of the scan period, and wherein the second excitation voltage has the opposite polarity of the first excitation voltage, and wherein the interface receives first and second measurement signals from a first strip electrode from the second set of strip electrodes during the first and second portions of the scan period, respectively; and an analog front end (AFE) that is coupled to the interface so as to receive the measurement signal, wherein the AFE integrates the first and second measurement signal to generate first and second integrated signals, and wherein the AFE combines first and second integrated signals to generate an output signal.

In accordance with an embodiment of the present invention, the interface further comprises: a multiplexer that is coupled to each strip electrodes from the second set of strip electrodes and that is coupled to the AFE; and an exciter that is coupled to each strip electrode from the second strip electrodes.

In accordance with an embodiment of the present invention, a method is provided. The method comprises applying a first voltage to a first set of column electrodes within a touch panel during a first interval; applying a second voltage to a second sets of column electrodes within the touch panel during the first interval, wherein the first and second sets of electrodes are adjacent to one another, and wherein the second voltage has the opposite polarity of the first voltage; receiving a first measurement signal from a set of row electrodes in the touch panel during the first interval; integrating the first measurement signal to generate a first integrated signal; applying the first voltage to the second set of column electrodes within the touch panel during a second interval; applying the second voltage to the first set of column electrodes within the touch panel during the second interval; receiving a second measurement signal from the set of row electrodes in the touch panel during the second interval; integrating the second measurement signal to generate a second integrated signal; and combining the first and second integrated signals to generate an output signal.

In accordance with an embodiment of the present invention, the step of combining further comprises: digitizing the first and second integrated signals to generate first and second digitized signals; delaying the first digitized signal; and adding the first and second digitized signals together.

In accordance with an embodiment of the present invention, the method further comprises activating an integrator for a first sample period during the first interval and for a second sample period during the second interval.

In accordance with an embodiment of the present invention, the method further comprises: repeating for each pair of adjacent sets of column electrodes and each set of column electrodes the steps of applying a first voltage during the first interval, applying the second voltage during the first interval, receiving the first measurement signal, integrating the first measurement signal, applying the first voltage during the second interval, applying the second voltage during the second interval, receiving the second measurement signal, integrating the second measurement, and combining the first and second integrated signals; and generating a capacitance profile for the touch panel.

In accordance with an embodiment of the present invention, the method further comprises: scanning the touch panel by repeating for each pair of adjacent sets of column electrodes and each set of column electrodes the steps of applying a first voltage during the first interval, applying the second voltage during the first interval, receiving the first measurement signal, integrating the first measurement signal, applying the first voltage during the second interval, applying the second voltage during the second interval, receiving the second measurement signal, integrating the second measurement, and combining the first and second integrated signals; and determining a location of a touch event based at least in part on the step of scanning and the capacitance profile.

In accordance with an embodiment of the present invention, an apparatus is provided. The apparatus comprises means for applying a first voltage to a first set of column electrodes within a touch panel during a first interval; means for applying a second voltage to a second sets of column electrodes within the touch panel during the first interval, wherein the first and second sets of electrodes are adjacent to one another, and wherein the second voltage has the opposite polarity of the first voltage; means for receiving a first measurement signal from a set of row electrodes in the touch panel during the first interval; means for integrating the first measurement signal to generate a first integrated signal; means for applying the first voltage to the second set of column electrodes within the touch panel during a second interval; means for applying the second voltage to the first set of column electrodes within the touch panel during the second interval; means for receiving a second measurement signal from the set of row electrodes in the touch panel during the second interval; means for integrating the second measurement signal to generate a second integrated signal; and means for combining the first and second integrated signals to generate an output signal.

In accordance with an embodiment of the present invention, the means for combining further comprises: means for digitizing the first and second integrated signals to generate first and second digitized signals; means for delaying the first digitized signal; and means for adding the first and second digitized signals together.

In accordance with an embodiment of the present invention, the apparatus further comprises means for activating an integrator for a first sample period during the first interval and for a second sample period during the second interval.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
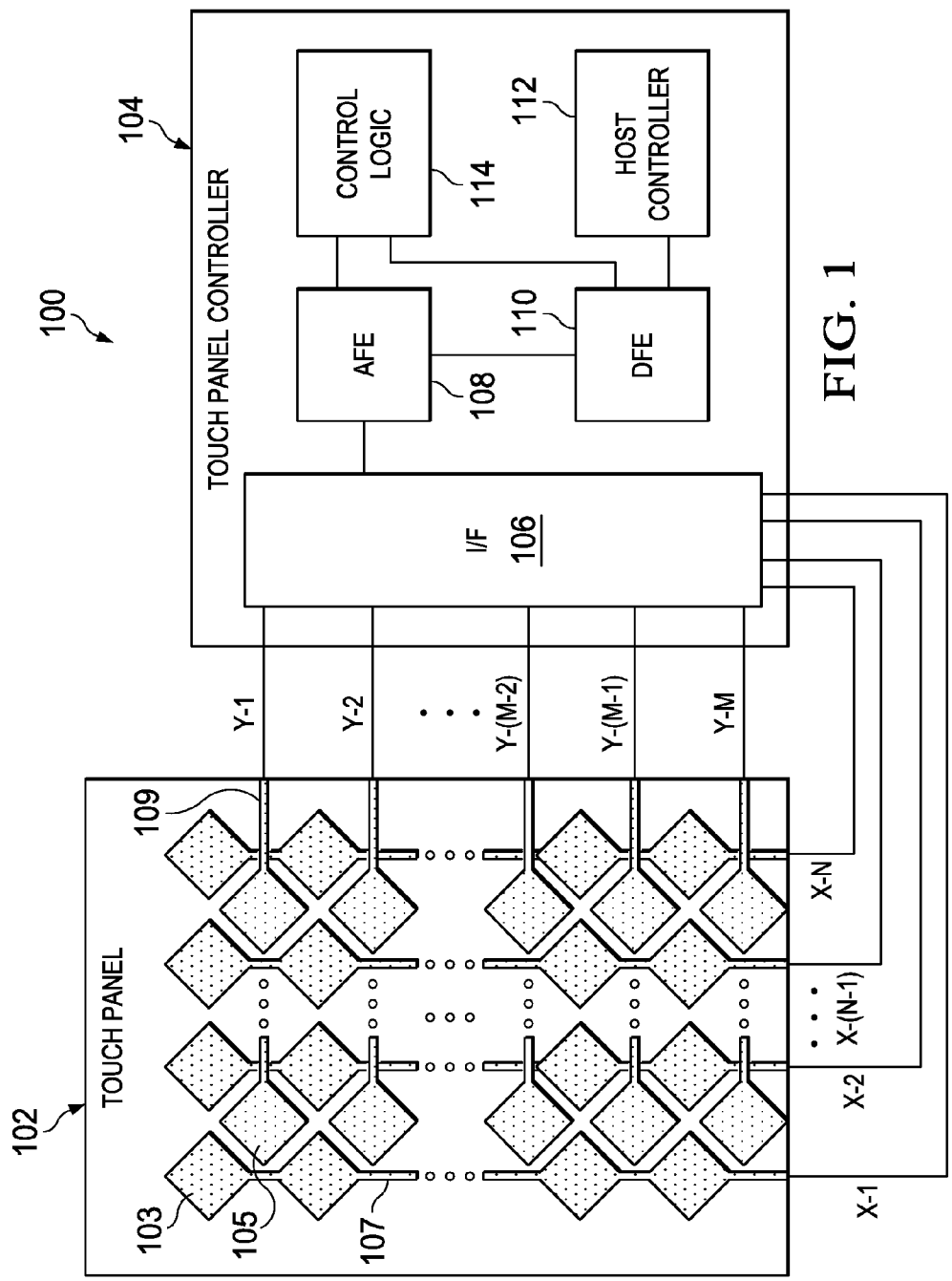
FIG. 1 is a diagram of an example of a system in accordance with an embodiment of the present invention.

Refer now to the drawings wherein depicted elements are, for the sake of clarity, not necessarily shown to scale and wherein like or similar elements are designated by the same reference numeral through the several views.

Figure 2:
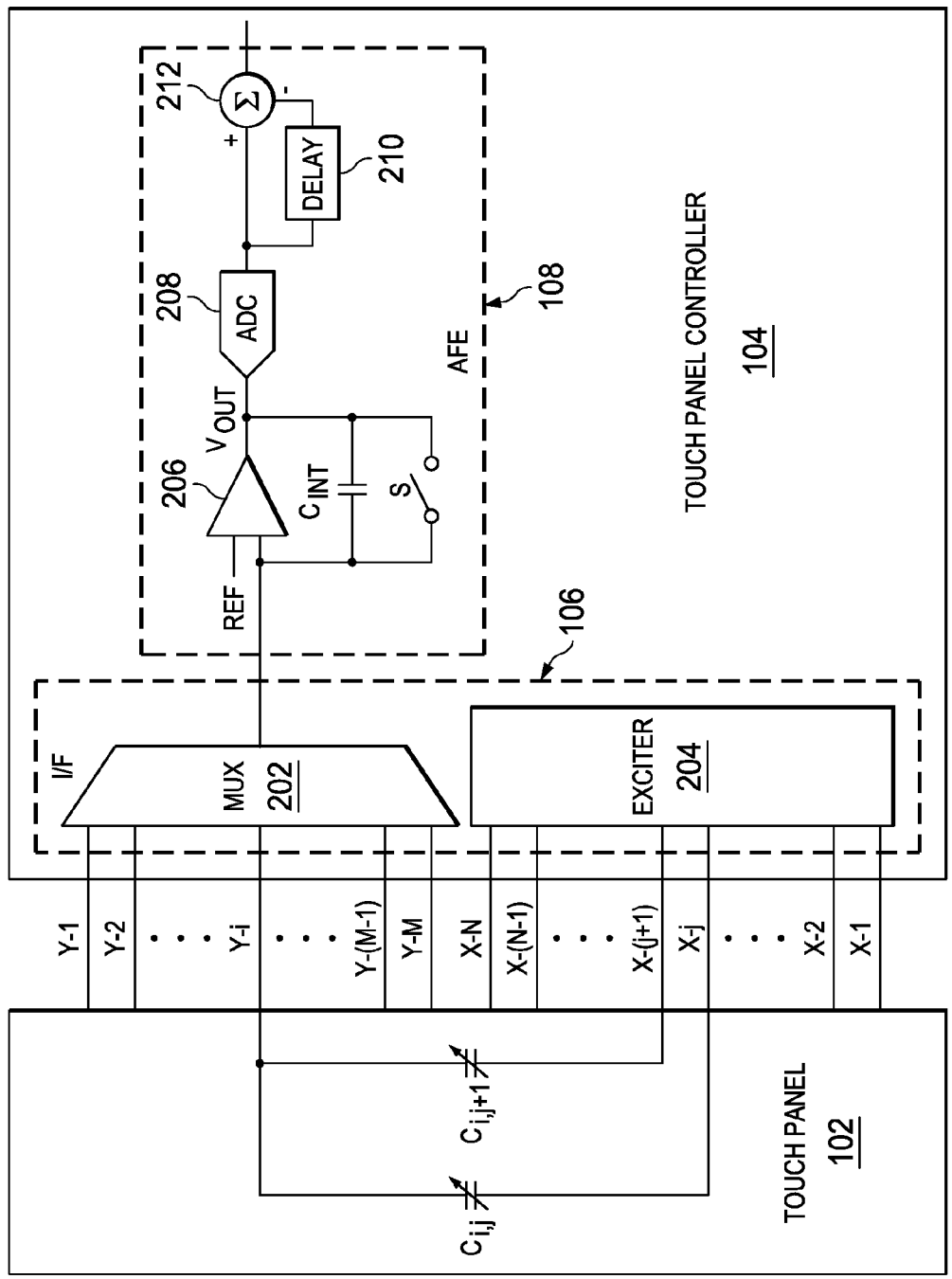
FIG. 2 is a diagram depicting an example of the touch panel, interface, and analog front end (AFE) of FIG. 1 in greater detail.

Turning to FIG. 1, an example of a system 100 in accordance with an embodiment of the present invention can be seen. As shown, the touch panel 102 is generally comprised of a set of column electrodes (i.e., electrode 105), where each electrode of each column is coupled together by a strip electrode (i.e., strip electrode 107), and a set of row electrodes (i.e., electrode 109), where each electrode of each row is coupled together by a strip electrode (i.e., strip electrode 107). The strip electrodes for each column (i.e., strip electrode 107) are then coupled to the interface or I/F 106 of the touch panel controller 104 by terminals X-1 to X-N, while the strip electrodes for each row (i.e., strip electrode 109) are coupled to the interface 106 by terminals Y-1 to Y-M. The interface 106 is able to communicate with the AFE 108, and the AFE is able to communicate data to the digital front end 110. Each of the AFE 108 and DFE 110 also receive control signals (i.e., clock signals) from the control logic 114, and the host controller 104 is able to receive data from the DFE 110. As shown in greater detail in FIG. 2, the interface 106 is generally comprised of a multiplexer or mux 202 and an exciter, while the AFE 108 is generally comprised of an integrator (which generally includes amplifier 206, capacitor CINT, and switch S), an analog-to-digital converter (ADC) 208, and a summing circuit (which generally includes delay circuit 210 and adder 212).

In operation, the interface 106 (which is usually controlled by the control logic 114) selects and excites columns of electrodes (i.e., electrode 103) and "scans through" the rows of row electrodes (i.e., electrode 105) so that a touch position can be resolved. In the example shown in FIGS. 2 and 3, interface 204 is exciting two adjacent columns through terminals X-j and X-(j+1) with excitation signals EXCITE[j] and EXCITE[j+1], and interface 106 receives a measurement signal from a row associated with terminal Y-i. As a result of this excitation, two capacitors $C_{i,j}$ and $C_{i,j+1}$ are formed at the intersection of the columns associated with terminals X-j and X-(j+1) and the row associated with terminal Y-i.

Figure 3:
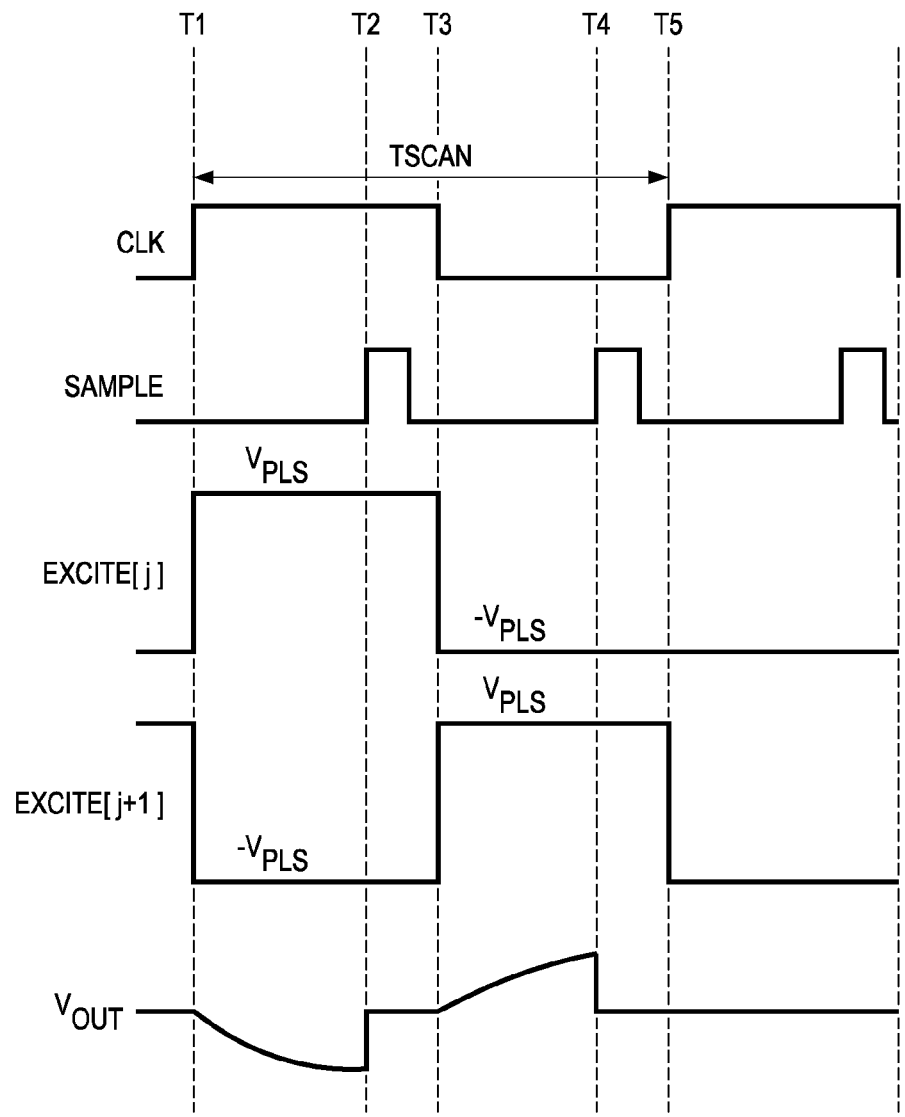
FIG. 3 is a timing diagram depicting and example of the operation of the AFE and interface of FIG. 2.

Initially, this type of operation can be used to calibrate the touch panel 102. Because the base capacitances for the touch sensor (i.e., $C_{i,j}$) are dependant on the characteristic of the touch panel (i.e., touch panel 102), these capacitances can vary from panel to panel and can vary over time, so the touch panel controller 104 is able to construct a capacitance profile for touch panel by excitation of pairs of rows of electrodes. Preferably, the exciter 204 provides signals of opposing polarity so that the pairs of capacitors (i.e., capacitors $C_{i,j}$ and $C_{i,j+1}$) can operate in a differential arrangement. As shown in FIG. 3, the exciter 204 uses an excitation clock signal CLK (which can be provided by control logic 114). At time T1, a scan period TSCAN begins, and capacitors $C_{i,j}$ and $C_{i,j+1}$ receive voltages of $+V_{PLS}$ and $-V_{PLS}$, respectively, during the beginning of the scan period TSCAN. During the interval between times T1 and T2, the sample signal SAMPLE (from control logic 114) is logic low, which indicates that switch S is "off" so that the integrator is able to integrate the measurement signal for this interval. The resulting output voltage $V_{OUT}$ at time T2 (from the integrator) is then:

$$V_{OUT}(T2) = -V_{PLS}\frac{C_{i,j} - C_{i,j+1}}{C_{INT}} + REF \quad (1)$$

Subsequently, at time T3 and during another portion of the scan period TSCAN, capacitors $C_{i,j}$ and $C_{i,j+1}$ receive voltages of $-V_{PLS}$ and $+V_{PLS}$, respectively, while the integrator performs an integration from time T3 to T4. The resulting output voltage $V_{OUT}$ at time T4 is:

$$V_{OUT}(T5) = V_{PLS}\frac{C_{i,j} - C_{i,j+1}}{C_{INT}} + REF \quad (2)$$

Each of the output voltages $V_{OUT}$ from times T2 and T45 are digitized by ADC 208 (which can, for example, be a successive approximation register or SAR ADC). Because the output voltage $V_{OUT}$ at time T2 occurs before the output voltage $V_{OUT}$ at time T4, it is delayed by delay circuit 210 and then subtracted from the output voltage $V_{OUT}$ at time T2 by adder 212, yielding:

$$V_{OUT}(T4) = -V_{OUT}(T2) = 2V_{PLS}\frac{C_{i,j} - C_{i,j+1}}{C_{INT}} \quad (3)$$

By use of equation (3), the difference in capacitance between capacitors $C_{i,j}$ and $C_{i,j+1}$ can be determined as is as follows:

$$C_{i,j} - C_{i,j+1} = C_{INT}\frac{V_{OUT}(T4) - V_{OUT}(T2)}{2V_{PLS}} \quad (4)$$

The difference in capacitance between each pair of capacitors on touch panel 102 can be performed to generate a capacitance profile, which can be used to interpolate the position of a touch event during subsequent scanning of the touch panel 102.

Figure 4:
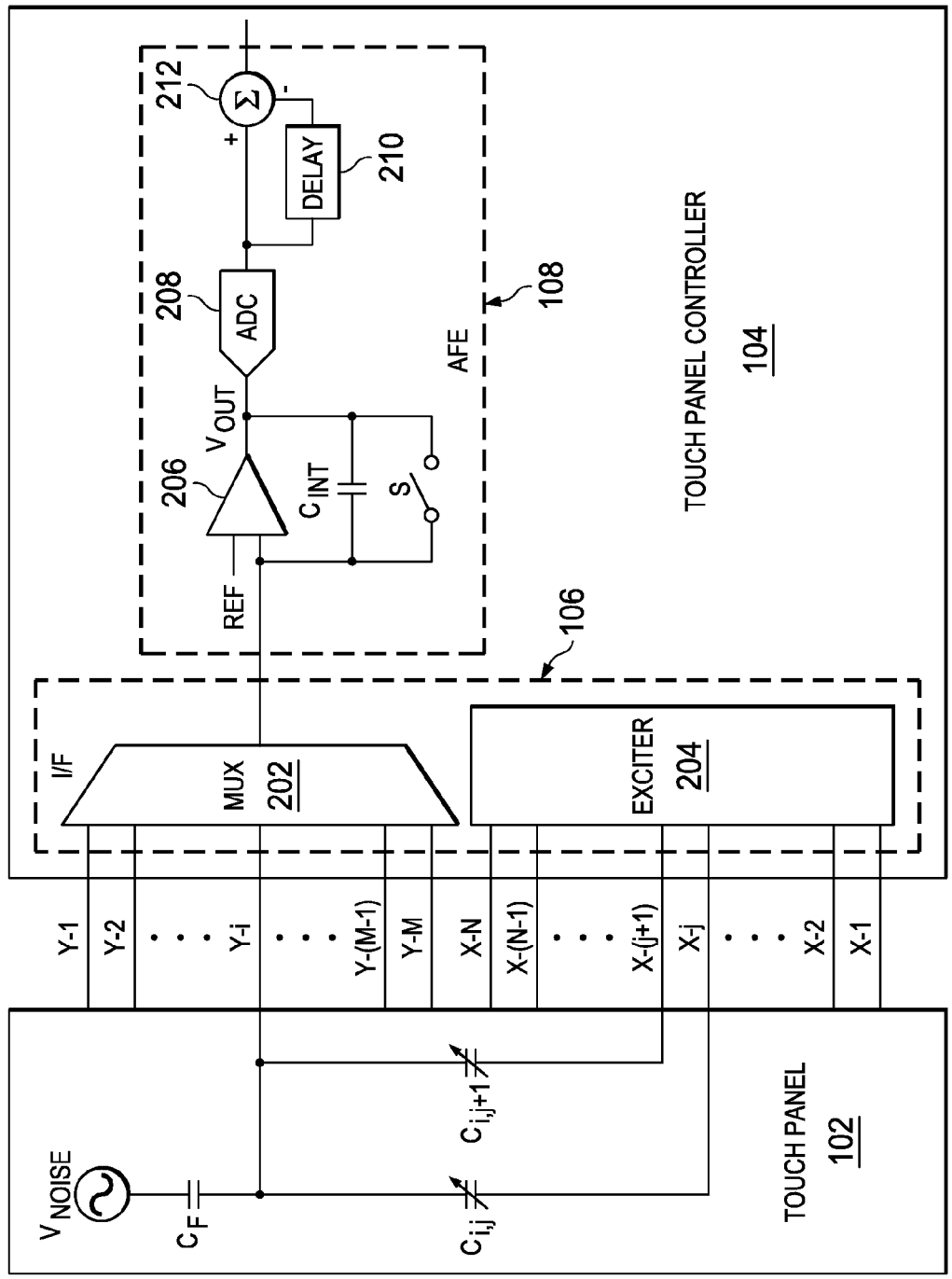
FIG. 4 is a diagram depicting the touch panel, interface, and AFE with a touch event.

One issue with touch screen controllers (i.e., touch screen controller 104) and touch panels (i.e., touch panel 102) is noise injected during a touch event, but the interface 106 and AFE 108 are able to compensate for noise (i.e., 60-cycle noise). As shown in the example of FIG. 4, a touch event is occurring at the location represented by capacitors $C_{i,j}$ and $C_{i,j+1}$; this touch event is represented by capacitor $C_F$ and can be referred to as a touch capacitance. Because of the touch event, noise $V_{NOISE}$ is also introduced and can be represented as follows:

$$V_{NOISE} = V_n \sin(\omega t) \quad (5)$$

The resulting output noise $V_{NOUT}$ from AFE 108, thus, is:

$$V_{NOUT} = V_n \frac{C_F}{C_{INT}}\left(\sin\left(\omega\left(t + \frac{1}{2F_{CLK}}\right)\right) - \sin(\omega t)\right), \quad (6)$$

where $F_{CLK}$ is the frequency of signal CLK. If frequency $F_{CLK}$ is chosen such that:

$$\frac{\omega}{2F_{CLK}} \approx 0, \quad (7)$$

then the noise $V_{NOUT}$ becomes approximately equal to zero. Thus, by using differential excitation of adjacent capacitors (i.e., capacitors $C_{i,j}$ and $C_{i,j+1}$), noise rejection can be substantially increased.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:
1. An apparatus comprising:
    an interface having a first set of terminals and a second set of terminals,
        wherein the first and second sets of terminals are configured to be coupled to a touch panel,
        wherein the interface provides a first excitation voltage to a first terminal from the first set of terminals during a first portion of a scan period, and wherein the interface provides a second excitation voltage to a second terminal from the first set of terminals during the first portion of the scan period, and wherein the interface provides the first excitation voltage to the second terminal from the first set of terminals during a second portion of the scan period, and wherein the interface provides the second excitation voltage to the first terminal from the first set of terminals during the second portion of the scan period, and wherein the second excitation voltage has the opposite polarity of the first excitation voltage, and wherein the interface receives first and second measurement signals from a first terminal from the second set of terminals during the first and second portions of the scan period, respectively; and an analog front end (AFE) that is coupled to the interface so as to receive the first and second measurement signals, wherein the AFE integrates the first and second measurement signal to generate first and second integrated signals, and wherein the AFE combines first and second integrated signals to generate an output signal.

2. The apparatus of claim 1, wherein the interface further comprises:

a multiplexer that is coupled to each terminal from the second set of terminals and that is coupled to the AFE; and an exciter that is coupled to each terminal from the second set terminals.

3. The apparatus of claim 2, wherein the AFE further comprises:

an integrator that is coupled to the multiplexer;

an analog-to-digital converter (ADC) that is coupled to the integrator; and a summing circuit that is coupled to the ADC.

4. The apparatus of claim 3, wherein the integrator further comprises:

an amplifier having a first input terminal, a second input terminal, and an output terminal, wherein the first input terminal of the amplifier receives a reference voltage, and wherein the following input terminal of the amplifier is coupled to the multiplexer, and wherein the output terminal of the amplifier is coupled to the ADC;

a capacitor that is coupled between the second input terminal of the amplifier and the output terminal of the amplifier; and a switch that is coupled between the second input terminal of the amplifier and the output terminal of the amplifier, wherein the switch is controlled by a sample signal.

5. The apparatus of claim 4, wherein the summing circuit further comprises:

a delay circuit that is coupled to the ADC; and an adder that is coupled to the ADC and delay circuit.

6. The apparatus of claim 5, wherein the touch panel controller further comprises:

a digital front end (DFE) that is coupled to the AFE; and control logic that is coupled to the DFE and AFE.

7. An apparatus comprising:

a touch panel having:

a plurality of column sensor electrodes arranged in a plurality of columns;

a first set of strip electrodes, wherein each strip electrode from the first set of strip electrodes is coupled to each column electrode within at least one of the plurality of columns;

a plurality of row sensor electrodes arranged in a plurality of rows; and a second set of strip electrodes, wherein each strip electrode from the second set of strip electrodes is coupled to each row electrode within at least one of the plurality of rows; and a touch panel controller having:

an interface that is coupled to each strip electrode from the first and second sets of strip electrodes, wherein the interface provides a first excitation voltage to a first strip electrode from the first set of strip electrodes during a first portion of a scan period, and wherein the interface provides a second excitation voltage to a second strip electrode from the first set of strip electrodes during the first portion of the scan period, and wherein the interface provides the first excitation voltage to the first strip electrode from the first set of strip electrodes during a second portion of the scan period, and wherein the interface provides the second excitation voltage to the second strip electrode from the first set of strip electrodes during the second portion of the scan period, and wherein the second excitation voltage has the opposite polarity of the first excitation voltage, and wherein the interface receives first and second measurement signals from a first strip electrode from the second set of strip electrodes during the first and second portions of the scan period, respectively; and an analog front end (AFE) that is coupled to the interface so as to receive the first and second measurement signals, wherein the AFE integrates the first and second measurement signal to generate first and second integrated signals, and wherein the AFE combines first and second integrated signals to generate an output signal.

8. The apparatus of claim 7, wherein the interface further comprises:

a multiplexer that is coupled to each strip electrode from the second set of strip electrodes and that is coupled to the AFE; and an exciter that is coupled to each strip electrode from the second set strip electrodes.

9. The apparatus of claim 8, wherein the AFE further comprises:

an integrator that is coupled to the multiplexer;

an analog-to-digital converter (ADC) that is coupled to the integrator; and a summing circuit that is coupled to the ADC.

10. The apparatus of claim 9, wherein the integrator further comprises:

an amplifier having a first input terminal, a second input terminal, and an output terminal, wherein the first input terminal of the amplifier receives a reference voltage, and wherein the second input terminal of the amplifier is coupled to the multiplexer, and wherein the output terminal of the amplifier is coupled to the ADC;

a capacitor that is coupled between the second input terminal of the amplifier and the output terminal of the amplifier; and a switch that is coupled between the second input terminal of the amplifier and the output terminal of the amplifier, wherein the switch is controlled by a sample signal.

11. The apparatus of claim 10, wherein the summing circuit further comprises:

a delay circuit that is coupled to the ADC; and an adder that is coupled to the ADC and delay circuit.

12. The apparatus of claim 11, wherein the touch panel controller further comprises:

a digital front end (DFE) that is coupled to the AFE; and
control logic that is coupled to the DFE and AFE.

13. A method comprising:

applying a first voltage to a first set of column electrodes within a touch panel during a first interval;

applying a second voltage to a second sets of column electrodes within the touch panel during the first interval, wherein the first and second sets of electrodes are adjacent to one another, and wherein the second voltage has the opposite polarity of the first voltage;

receiving a first measurement signal from a set of row electrodes in the touch panel during the first interval;

integrating the first measurement signal to generate a first integrated signal;

applying the first voltage to the second set of column electrodes within the touch panel during a second interval;

applying the second voltage to the first set of column electrodes within the touch panel during the second interval;

receiving a second measurement signal from the set of row electrodes in the touch panel during the second interval;

integrating the second measurement signal to generate a second integrated signal; and combining the first and second integrated signals to generate an output signal.

14. The method of claim 13, wherein the step of combining further comprises:

digitizing the first and second integrated signals to generate first and second digitized signals;

delaying the first digitized signal; and adding the first and second digitized signals together.

15. The method of claim 14, wherein the method further comprises activating an integrator for a first sample period during the first interval and for a second sample period during the second interval.

16. The method of claim 15, wherein the method further comprises:

repeating for each pair of adjacent sets of column electrodes and each set of column electrodes the steps of applying a first voltage during the first interval, applying the second voltage during the first interval, receiving the first measurement signal, integrating the first measurement signal, applying the first voltage during the second interval, applying the second voltage during the second interval, receiving the second measurement signal, integrating the second measurement, and combining the first and second integrated signals; and generating a capacitance profile for the touch panel.

17. The method of claim 16, wherein the method further comprises:

scanning the touch panel by repeating for each pair of adjacent sets of column electrodes and each set of column electrodes the steps of applying a first voltage during the first interval, applying the second voltage during the first interval, receiving the first measurement signal, integrating the first measurement signal, applying the first voltage during the second interval, applying the second voltage during the second interval, receiving the second measurement signal, integrating the second measurement, and combining the first and second integrated signals; and determining a location of a touch event based at least in part on the step of scanning and the capacitance profile.

18. An apparatus comprising:

means for applying a first voltage to a first set of column electrodes within a touch panel during a first interval;

means for applying a second voltage to a second sets of column electrodes within the touch panel during the first interval, wherein the first and second sets of electrodes are adjacent to one another, and wherein the second voltage has the opposite polarity of the first voltage;

means for receiving a first measurement signal from a set of row electrodes in the touch panel during the first interval;

means for integrating the first measurement signal to generate a first integrated signal;

means for applying the first voltage to the second set of column electrodes within the touch panel during a second interval;

means for applying the second voltage to the first set of column electrodes within the touch panel during the second interval;

means for receiving a second measurement signal from the set of row electrodes in the touch panel during the second interval;

means for integrating the second measurement signal to generate a second integrated signal; and means for combining the first and second integrated signals to generate an output signal.

19. The apparatus of claim 18, wherein the means for combining further comprises:

means for digitizing the first and second integrated signals to generate first and second digitized signals;

means for delaying the first digitized signal; and means for adding the first and second digitized signals together.

20. The apparatus of claim 18, wherein the apparatus further comprises means for activating an integrator for a first sample period during the first interval and for a second sample period during the second interval.

* * * * *